(12) United States Patent
Sawanobori

(10) Patent No.: US 6,486,980 B1
(45) Date of Patent: Nov. 26, 2002

(54) FILM SCANNER

(75) Inventor: Keiji Sawanobori, Tokyo (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/332,506

(22) Filed: Jun. 14, 1999

(30) Foreign Application Priority Data

Jun. 15, 1998 (JP) .......................................... 10-166705

(51) Int. Cl.[7] .............................................. H04N 1/04
(52) U.S. Cl. ....................... 358/487; 358/506; 358/474; 358/475; 358/496
(58) Field of Search ................................ 358/487, 506, 358/496, 474, 505, 475, 509; 362/17, 18, 31, 224, 280, 323, 355; 399/211; 348/96, 97

(56) References Cited

U.S. PATENT DOCUMENTS 4,786,448 A * 11/1988 Matsui ........................ 355/40
6,139,161 A * 10/2000 Honda et al. .................. 362/17

* cited by examiner

*Primary Examiner*—Cheukfan Lee
(74) *Attorney, Agent, or Firm*—Greenblum & Bernstein, P.L.C.

(57) ABSTRACT

A film scanner for electronically scanning an image recorded on a photographic film, includes an image scanner unit, a liquid crystal display (LCD) unit, and a back-light unit in a body. The back-light radiates a light from a top surface of the body, and the film is slidably supported on the top surface. The image scanner unit scans the image of the film illuminated by the back-light unit. The liquid crystal display (LCD) unit illuminated by the back-light unit, displays the image scanned by the image scanner unit. The LCD unit is pivotably removable from the top surface, such that the film is disclosed.

17 Claims, 8 Drawing Sheets

FILM SCANNER

BACKGROUND OF THE INVENTION

1. Field of the Invention

The present invention relates to a film scanner for electronically scanning an image on a photographic film.

2. Description of the Related Art

A film scanner is known that electronically scans and reads an image on a photographic film. A digital image signal is generated and output by the film scanner, and is input to a peripheral apparatus such as a computer, which displays the image on a display unit. This film scanner has poor portability, because it must accompany such a peripheral apparatus.

A solution would be a film scanner including a liquid crystal display (LCD) unit. However, it is difficult to decrease an apparatus size and an electric power consumption. The power consumption factor seriously influences a duration time by which the film scanner can be driven by a battery.

SUMMARY OF THE INVENTION

Therefore, an object of the present invention is to provide a film scanner of high portability and low electric power consumption.

A film scanner according to the present invention comprises an image scanner unit which scans an image recorded on a photographic film, a LCD unit which displays the image scanned by the image scanner unit, and a back-light unit for illuminating the LCD unit and the photographic film.

BRIEF DESCRIPTION OF THE DRAWINGS

The present invention will be better understood from the description of the preferred embodiments of the invention set forth below together with the accompanying drawings, in which.

DESCRIPTION OF THE PREFERRED EMBODIMENTS

Hereinafter, the preferred embodiments of the present invention are described with reference to the attached drawings.

Figure 1:
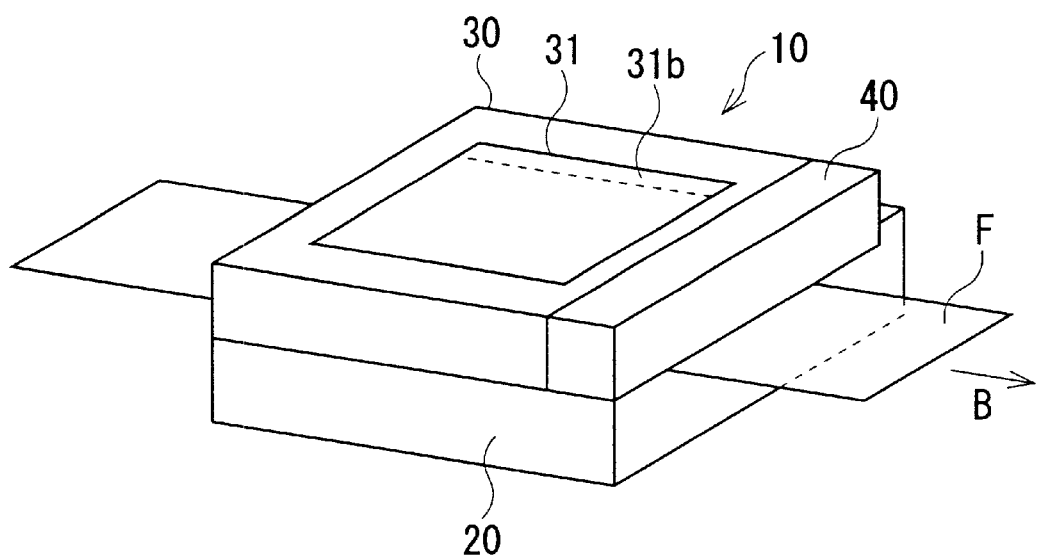
FIG. 1 is a perspective view showing a first embodiment of a film scanner according to the present invention, to which a film is to be inserted.
Figure 2:
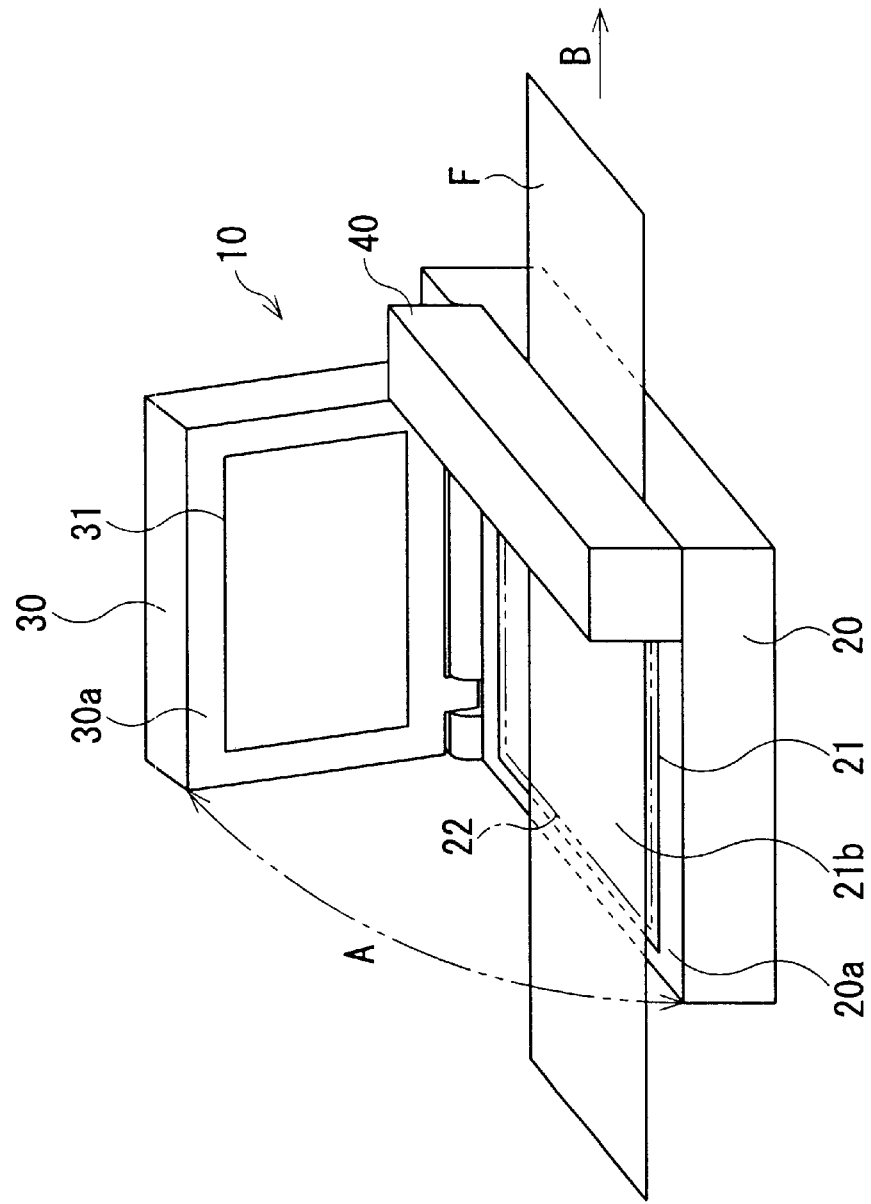
FIG. 2 is a perspective view of the first embodiment showing an opened LCD unit and a closed image scanner.
Figure 3:
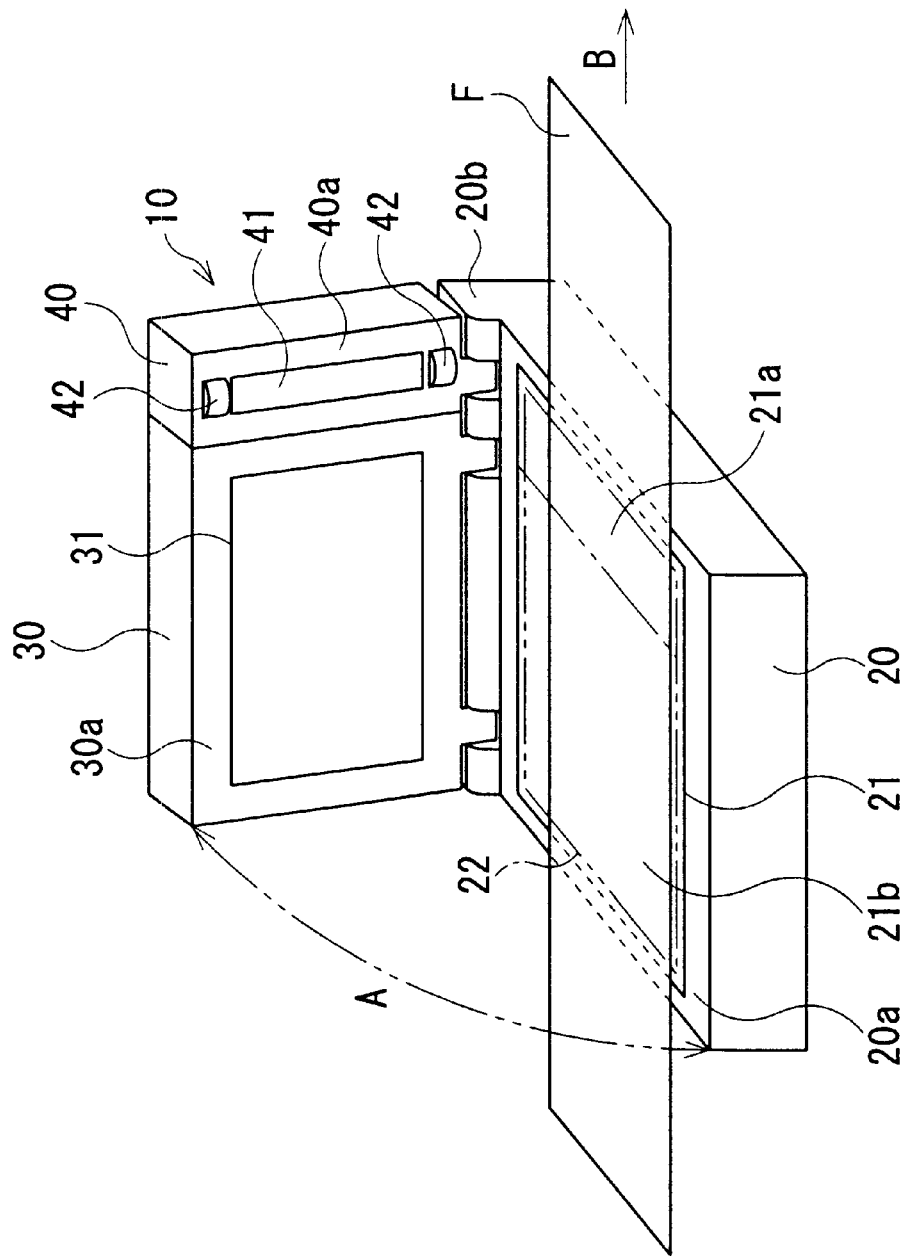
FIG. 3 is a perspective view of the first embodiment showing the LCD unit and image scanner opened.

FIGS. 1 to 3 are perspective views showing a first embodiment of a film scanner 10 according to the present invention. The film scanner 10 includes a body 20, which slidably supports a photographic film F on a top film supporting surface 20a (FIG. 2) in a longitudinal direction B. The photographic film F can be either a negative type or a positive type film. A liquid crystal display (LCD) unit 30 and an image scanner unit 40 are disposed on the top surface 20a, and guide the photographic film F, when interposed therebetween, in conjunction with the top surface 20a in the direction B. The LCD unit 30 and the image scanner 40 are aligned in parallel to a longitudinal direction of the photographic film F, that is, in the direction B. The image scanner unit 40 scans an image recorded on the photographic film F and converts optical image-pixel data to electric image-pixel data. The LCD unit 30 includes a liquid crystal display (LCD) 31 for displaying the image-pixel data scanned by the image scanner unit 40. Besides the image, the LCD 31 displays photographic information, such as what percentage of the photographic film F has been scanned by the image scanner unit 40, in an information area 31b. The LCD 31 including the information area 31b has a width wider than the width of the photographic film F, and the area 31b is always illuminated by the light from back-light unit 22 (FIG. 2).

In FIGS. 2 and 3, the image scanner unit 40 extends in a width-direction of the photographic film F, and includes a line sensor 41 on a back surface 40a thereof, that extends across the width of the photographic film F such that image-pixel data of a total width is simultaneously scanned. A pair of motorized conveyer rollers 42, made, for example, of rubber, are disposed on the back surface 40a at both ends of the line sensor 41, and rotate by frictionally engaging the photographic film F so as to intermittently convey the photographic film F in the direction B.

In FIGS. 2 and 3, a back-light unit 22 is disposed in the body 20, radiates light upwardly from a window 21 opening in the top surface 20a. The photographic film F is illuminated by the light from the back-light unit 22 in a scanning-illumination area 21a of the window 21 corresponding to the image scanner unit 40. The LCD 31 is illuminated by the light from the back-light unit 22 in a display-illumination area 21b of the window 21 corresponding to the LCD 31. The back-light unit 22 includes a flat fluorescent lamp (not shown) as a light source, for example.

In FIGS. 2 and 3, the LCD unit 30 and the image scanner unit 40 are pivoted at an edge of the top surface 20a by a hinge 20b which allows independent rotational motion of the LCD unit 30 and the image scanner unit 40 about a horizontal axis parallel to the edge, as shown by an arrow "A" in FIGS. 2 and 3. The LCD unit 30 and the image scanner unit 40 swing such that they are flatly foldable against the top surface 20a and are widely openable for freely disclosing the photographic film F.

When the photographic film F is to be scanned, the LCD unit 30 and the image scanner unit 40 are flatly folded against the top surface 20a with the photographic film F slidably interposed therebetween, as shown in FIG. 1. The image scanner unit 40 intermittently conveys the photographic film F at a predetermined speed in the direction B, and the line sensor 41 reads the image of the photographic film F line by line synchronously with the intermittent conveyance of the photographic film F. The information area 31b is illuminated even when the photographic film F is scanned by the image scanner unit 40. The information, such as the percentage scan completion of the photographic film F, is displayed in the area 31b. The scanned images are stored in a memory 54 (FIG. 4) of the film scanner 10.

When the photographic film F is to be reviewed and confirmed prior to scanning, the LCD unit 30 is fully opened, as shown in FIG. 2, and the back-light unit 22 is utilized as a slide projector in the display-illumination area 21b. In the scanning-illumination area 21a, the light of the back-light unit 22 illuminates the photographic film F to be scanned by the image scanner unit 40.

When the photographic film F is to be only reviewed for confirmation, the LCD unit 30 and the image scanner unit 40 are fully opened, as shown in FIG. 3, and the entire back-light unit 22 is utilized as a slide projector. The photographic film F is illuminated over the total area of the top surface 20a by the light from the back-light unit 22, such that an image to be scanned next is selectable.

When scanned and stored images are to be displayed, the photographic film F is removed, and the LCD unit 30 is flatly folded. The total area of the LCD unit 30 is illuminated by the back-light unit 22, such that an image is displayed on the entire LCD panel 31.

Figure 4:
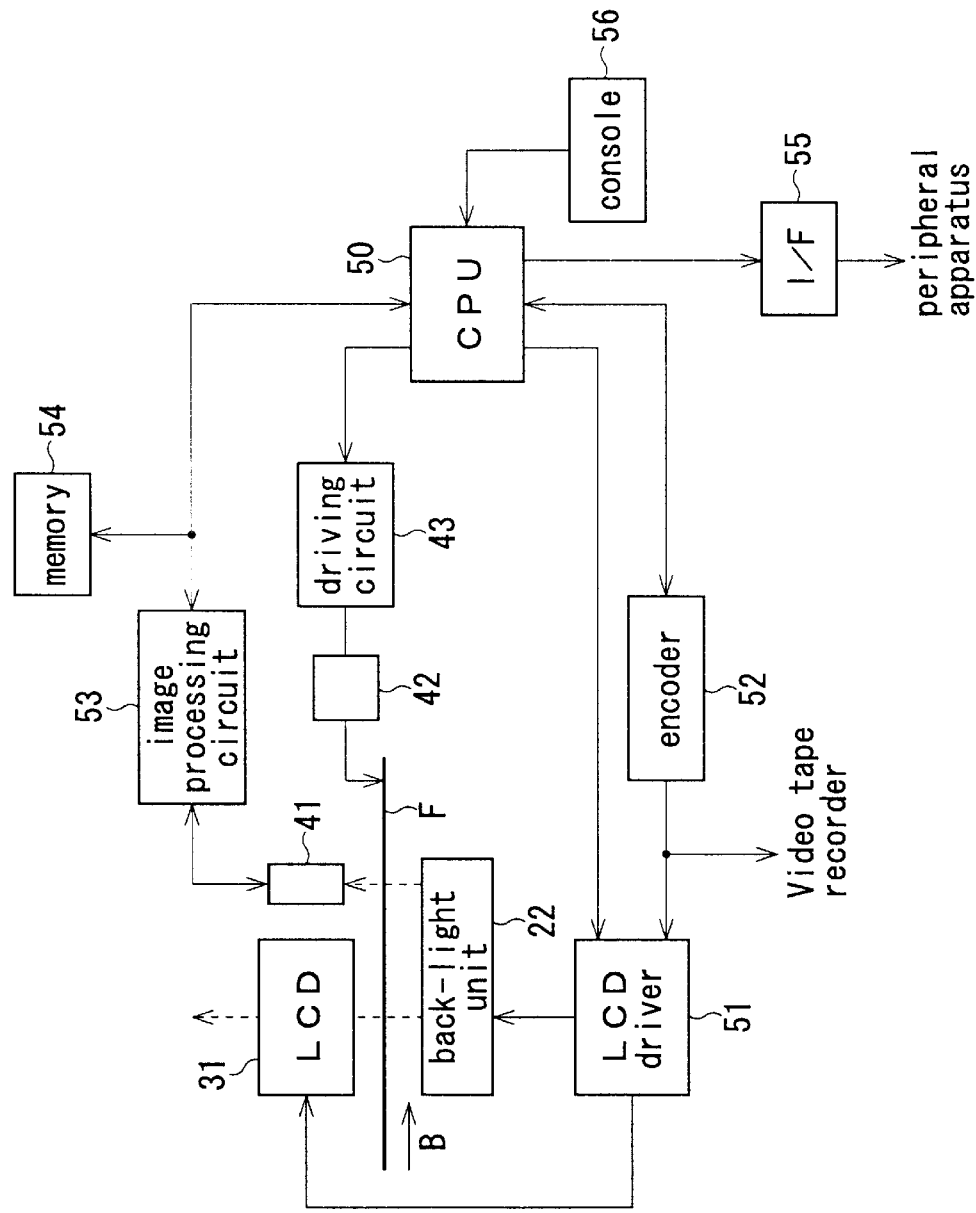
FIG. 4 is a block diagram of the film scanner of the first embodiment.

FIG. 4 is a block diagram of the film scanner of the first embodiment. The film scanner unit 10 is controlled manually by a console 56 (not shown in FIGS. 1 to 3) connected to a CPU 50. This control may be automated by sensors that sense the status of the LCD unit 30 and the image scanner unit 40. The LCD panel 31 is controlled by a LCD driver 51, which also controls the back-light unit 22, via the CPU 50. The conveyer rollers 42 are controlled by a driver circuit 43 via the CPU The electric image-pixel data output from the line sensor 41 are converted to digital image-pixel signals of primary colors red (R), green (G) and blue (B), which then undergo various image processes, such as shading compensation and noise reduction, in an image processing circuit 53. The processed image-pixel data are then stored in the memory 54. When the image stored in the memory 54 is to be displayed, the CPU 50 reads and inputs the data to an encoder 52, which encodes the R. G and B digital image-pixel signals to a video signal format consisting of color differential signals (Cr, Cb) and a luminance signal (Y). In the encoder 52, A color compensation, edge sharpening and other processes are also performed on the video signal prior to output to the LCD driver 51 or a peripheral video tape recorder.

The information displayed in the information area 31b is generated by the CPU 50 and displayed through the LCD driver 51 on the LCD 31.

An interface 55 is connected to the CPU 50, which outputs the digital image-pixel signal to a peripheral apparatus, such as a personal computer.

The first embodiment of the film scanner 10 has a high portability due to the LCD unit 30 being provided and the back-light unit 22 being dual-purposely utilized for a back-light of the LCD unit 30 as well as for a back-light of the image scanner unit 40. The back-light unit 22 is advantageously utilized because of the efficient electrical power consumption, in comparison to an apparatus that includes independent back-light units for an LCD unit and image scanner unit.

In a modification, the line sensor 41 may be intermittently conveyed along the photographic film F while scanning the image on the photographic film F.

Figure 5:
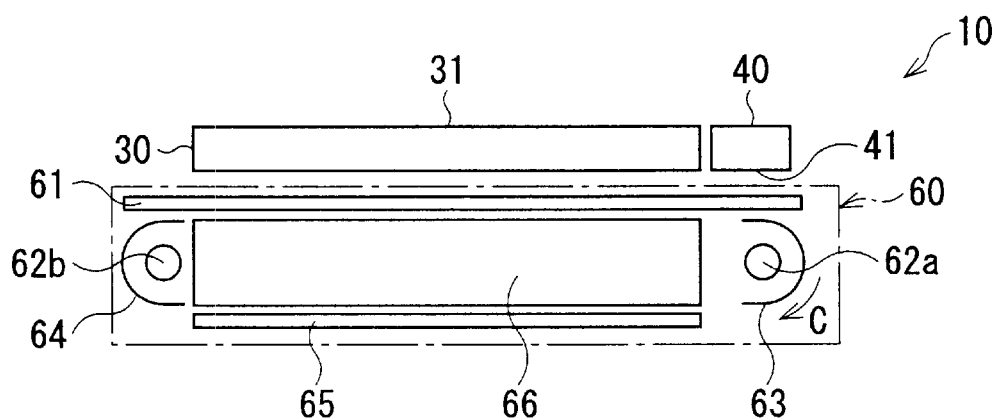
FIG. 5 is an elevational view showing a second embodiment of a film scanner according to the present invention, without an image scanner.
Figure 6:
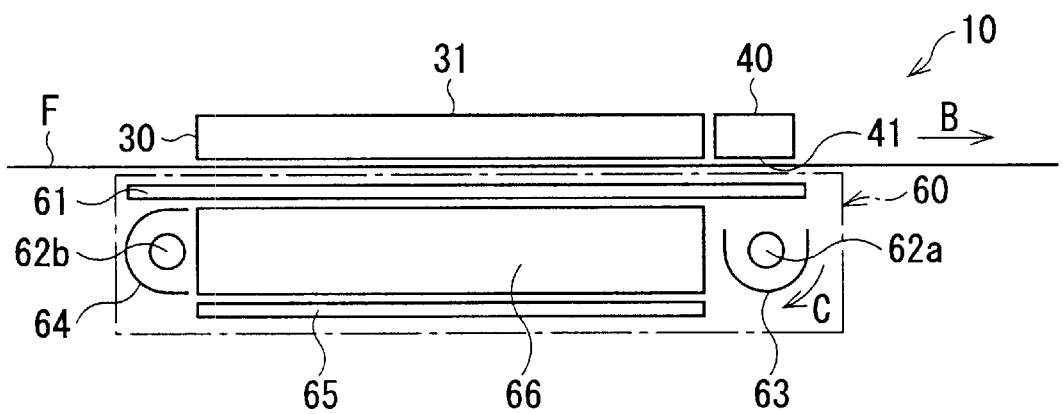
FIG. 6 is an elevational view showing the second embodiment of the film scanner according to the present invention, with an image scanner.

FIGS. 5 and 6 show a second embodiment. The second embodiment is different from the first embodiment in that a back-light unit 60 is incorporated. Since other portions are similar to those of the first embodiment, designations remain the same and descriptions are omitted. Similarly to the first embodiment, the LCD unit 30 and the image scanner 40 are aligned in a longitudinal direction of the photographic film F. The film scanner 10 includes a back-light unit 60 having a pair of (fluorescent lamp) light sources 62a and 62b, which extend in parallel with the width direction of the photographic film F and are positioned at opposite longitudinal ends of the film scanner 10. The film F is conveyed in the longitudinal direction by conveyer rollers (not shown) disposed in the image scanner unit 40, similarly to the first embodiment. The light source 62a is positioned below the image scanner unit 40, and an arcuate reflector 63 is disposed around this light source 62a. The reflector 63 is rotatable in a direction C around the light source 62a, such that light from the light source 62a is reflected toward the line sensor 41 or toward the opposite light source 62b, parallel to the top surface 20a. An arcuate reflector 64 is disposed around the light source 62b, which reflects light from the light source 62b toward the opposite light source 62a, parallel to the top surface 20a. A light conductor 66 is disposed between the light sources 62a and 62b below the LCD unit 30, which directs the light from the light source 62b toward the LCD unit 30, and the light from the light source 62a toward the LCD unit 30 when the light is directed to the light conductor 66, parallel to the top surface 20a. Thus, the LCD 31 can be illuminated by both light sources 62a and 62b. A flat reflector 65 is disposed below the light conductor 66 parallel to the top surface 20a, and reflects stray light directed downwardly from the light conductor 66 back to the light conductor 66. Light from the back-light unit 60 is diffused by a diffusion unit 61 before in radiating the LCD 31. When the arcuate reflector 63 is rotated to reflect the light toward the line sensor 41, the line sensor 41 is illuminated to allow scanning of the image on the photographic film F, while the LCD 31 is illuminated only by the light source 62b. The electric power required for the light source 62a is small as, primarily, the light is concentrated on the line sensor 41 for the image scanning to be performed, and is only secondarily utilized for illuminating the LCD 31.

In the second embodiment, the radiating direction of the light is changed by a rotation of the reflector 63. However, the reflector 63 may instead be deformed such that an opening for radiating the light is changed such that the line sensor 41 is illuminated.

In the second embodiment, a further decrease in power consumption is achieved.

Figure 7:
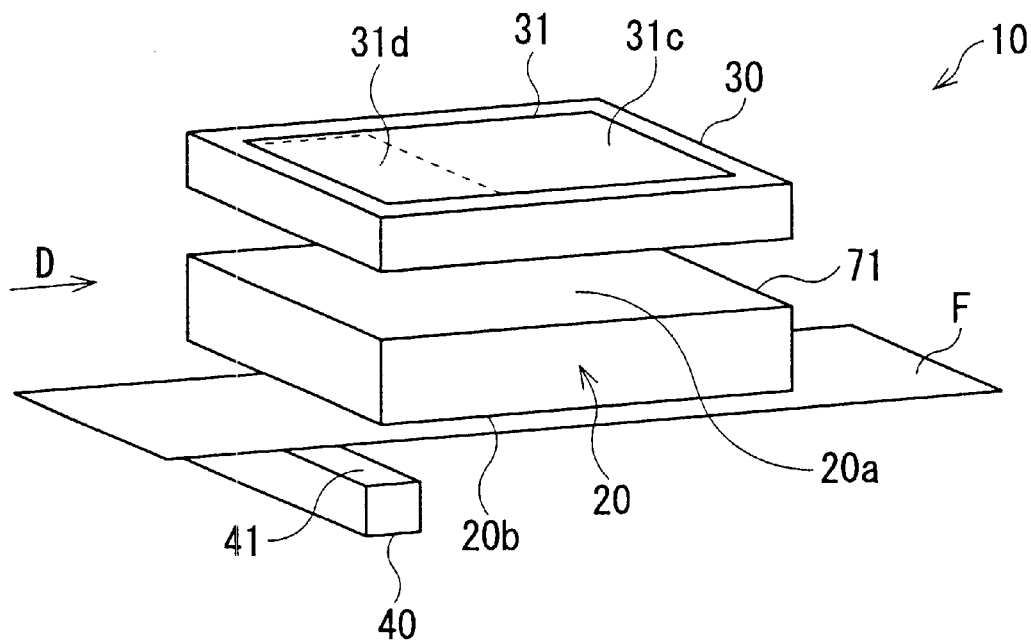
FIG. 7 is a perspective view showing a third embodiment of a film scanner according to the present invention.
Figure 8:
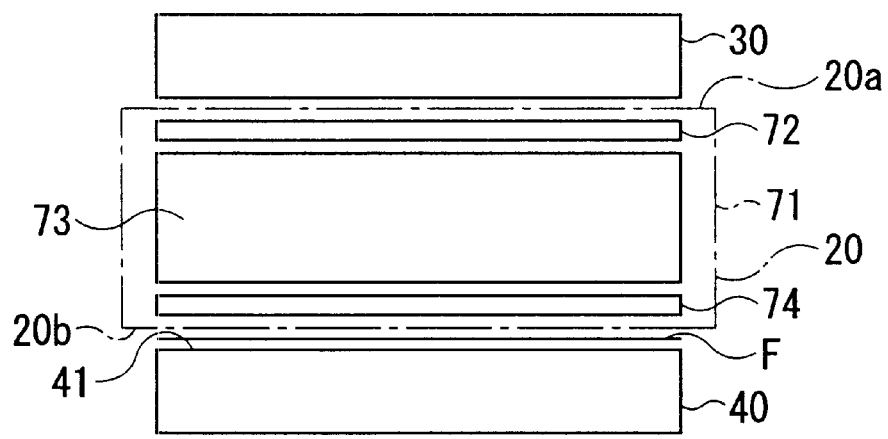
FIG. 8 is an elevational view showing the third embodiment of the film scanner according to the present invention.

FIG. 7 is a perspective view showing a third embodiment of a film scanner according to the present invention, and FIG. 8 is an elevational view. Like references refer to similar portions of the previous embodiments, and therefore designations remain the same and descriptions are omitted. The film scanner 10 includes a back-light unit 71 radiating light from a flat bottom surface 20b as well as from a top surface 20a of the body 20. The photographic film F is guided by the bottom surface 20b and image scanner unit 40 is disposed on the bottom surface 20b. The LCD unit 30 is disposed on the top surface 20a and has a size corresponding to a total size of the back-light unit 71. An area 31d corresponding to the image scanner unit 40 is disposed such that a black image is displayed during a scanning of the photographic film F by the image scanner unit 40, and an area 31c is used for displaying a scanned image. When the image scanner unit 40 is not used, the total area 31c and 31d is usable for displaying the image. The light is radiated from an area of the bottom surface 20b of the body 20 facing the line sensor 41, and through a remaining area of the bottom surface 20b, the light is radiated to illuminate the photographic film F. The film F is conveyed in the longitudinal direction by conveyer rollers (not shown) disposed in the image scanner unit 40, similarly to the first embodiment. Diffusion units 72 and 74 are disposed along the top surface 20a and the bottom surfaces 20b, respectively, which diffuse the light of a flat fluorescent lamp 73 to provide a greater evenness of lighting.

The third embodiment has an advantage that, in addition to the effect of the first embodiment, the photographic film F can be reviewed at any time. Since, the LCD unit 30 and the line sensor 41 are positioned on the top and the bottom surfaces of the back-light unit 71, the film F is not interposed between the LCD unit 30 and the back-light unit 71 during the scanning of the film F. Therefore, the image can be displayed in the area 31b of the LCD unit 30 even when the image is being scanned.

Figure 9:
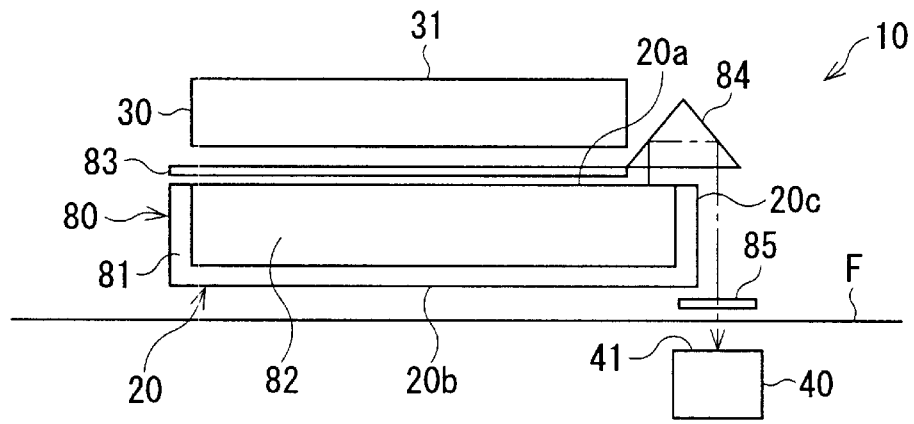
FIG. 9 is an elevational view showing a fourth embodiment of a film scanner according to the present invention.

FIG. 9 is an elevational view showing a fourth embodiment of a film scanner according to the present invention. Like references refer to similar portions of the previous embodiments, and therefore, designations remain the same and descriptions are omitted. The film scanner 10 includes a back-light unit 80 radiating light upwardly from a flat top surface 20a, and the LCD unit 30 is disposed on the top surface 20a. The light from a flat fluorescent lamp 82 is diffused by a diffusion unit 83 before in radiating the LCD unit 30. A prism 84 is disposed over the top surface 20a, which conducts a portion of the light downwardly along an outer side surface 20c of the body 20. The image scanner unit 40 is disposed offset from and parallel with a bottom surface 20b of the body 20, so as to be irradiated by the light conducted by the prism 84. A diffusion unit 85 is disposed between the prism 84 and the image scanner unit 40 for diffusing the light. A container-like reflector 81 is disposed in the back-light unit 80 for reflecting the light upwardly, thus the light is efficiently directed to the LCD 31 and line sensor 41. When the image is scanned by the image scanner unit 40, the photographic film F is conveyed by conveyer rollers (not shown) in a longitudinal direction along the bottom surface 20b. When the photographic film F is to be directly reviewed, the LCD unit 30 is opened and the photographic film F is guided by the flat top surface 20a.

In the fourth embodiment, in addition to the effect achieved by the first embodiment, an effect is achieved that the LCD unit 30 need not be disturbed by the photographic film F during an image scanning by the image scanner unit 40, thus display of an image is possible over the total area of the LCD 31.

Figure 10:
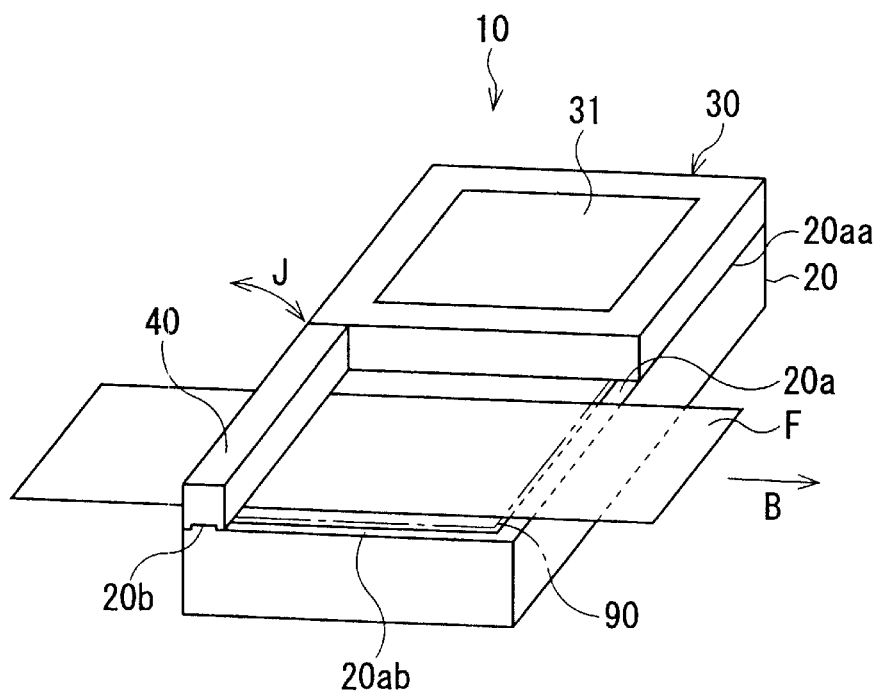
FIG. 10 is a perspective view showing a fifth embodiment of a film scanner according to the present invention.

FIG. 10 is a perspective view showing a fifth embodiment of a film scanner according to the present invention. Like references refer to similar portions of the previous embodiments, and therefore, designations remain the same and descriptions are omitted. The film scanner 10 includes a back-light unit 90 radiating light upwardly from a flat top surface 20a. The top surface 20a is separated into an area 20aa, where the LCD unit 30 is disposed, and an area 20ab for scanning and reviewing the photographic film F. In the area 20ab, the image scanner unit 40 is disposed at an end 20b of the area 20ab and a remaining area is used for reviewing the photographic film F. The LCD unit 30 and the image scanner unit 40 are aligned perpendicularly to a longitudinal direction of the photographic film F. The photographic film F placed on the area 20ab is conveyed in the longitudinal direction B by conveyer rollers (not shown) of the image scanner unit 40, similarly to the first embodiment. The LCD unit 30 is always illuminated by the back-light unit 71 without any interference. The image scanner unit 40 is rotatable in a direction J such that the area 20ab is fully usable for reviewing the photographic film F.

In the fifth embodiment, in addition to the effect achieved by the first embodiment, an effect is achieved that the LCD unit 30 and the image scanner unit 40 are independently and simultaneously utilizable, as well as allowing the photographic film F to be reviewed.

Figure 11:
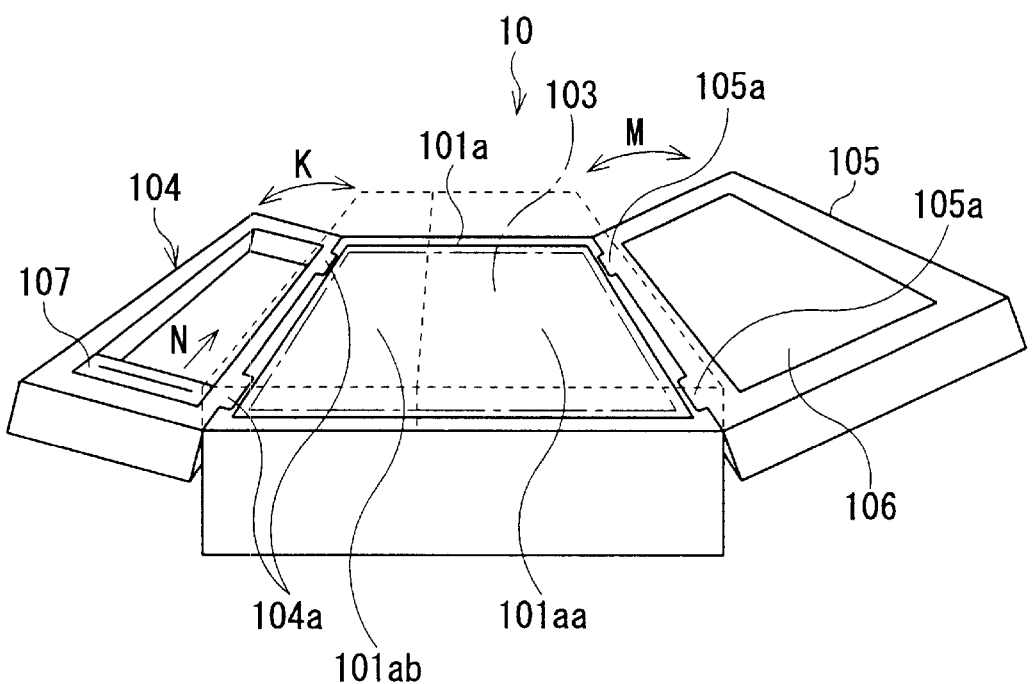
FIG. 11 is a perspective view showing a sixth embodiment of a film scanner according to the present invention.

FIG. 11 is a perspective view showing a sixth embodiment of a film scanner according to the present invention. Like references refer to similar portions of the previous embodiments, and therefore, designations remain the same and descriptions are omitted. The film scanner 10 includes a back-light unit 103 radiating light upwardly from a flat top surface 101a. The top surface 101a is separated into an area 101aa, over which an LCD unit 105 is disposable, and an area 101ab for scanning the photographic film F. In the area 101ab, the image scanner unit 104 is pivotable via a hinges 104a in a direction K around an axis parallel to one edge of the top surface 101a. In the area 101aa, the LCD unit 105 is pivotable via hinges 105a in a direction M around an axis parallel to another edge of the top surface 101a. When the photographic film F is to be scanned, the image scanner unit 104 is folded on the area 101ab and the photographic film F (not shown) is inserted from an end of the area 101ab. The photographic film F scanned is illuminated by the back-light unit 103, and is conveyed by conveyer rollers (not shown) in the direction N over the area 101ab by a line sensor 107 extending across the width of the photographic film F, in a similar fashion to the first embodiment. As for the alignment of the LDC unit 105 and the image scanner unit 104, the LCD unit 105 and the image scanner unit 104 are aligned perpendicularly to a longitudinal direction (N) of the photographic film F, similarly to the fifth embodiment. The LCD 106 is illuminated by the back-light unit 103 without any interference during image scanning by the image scanner unit 104. When the LCD unit 105 and the image scanner unit 104 are opened, such that the top surface 101a is disclosed, a total area of the top surface 101a is usable for reviewing a plurality of photographic films F.

In addition to the effects achieved by the fifth embodiment, the top surface 101a of the sixth embodiment is efficiently utilized.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No. 10-166705 (filed on Jun. 15, 1998) which is expressly incorporated herein, by reference, in its entirety.

What is claimed is:

1. A film scanner that electronically scans an image recorded on a photographic film, comprising:

a body including a film supporting surface that slidably guides said photographic film;

a back-light unit disposed in said body that radiates light from said film supporting surface;

an image scanner unit that scans said image on said photographic film illuminated by said light of said back-light unit, wherein said image scanner unit includes a line sensor that scans said image on said photographic film and said image scanner unit shifts said photographic film relative to said line sensor while interposing said photographic film between said film supporting surface and said line sensor; and a liquid crystal display (LCD) unit that displays said image scanned by said image scanner unit and is illuminated by said light of said back-light unit.

2. The film scanner of claim 1, wherein said film supporting surface is a top surface of said body, and said LCD unit and said image scanner unit are disposed on said top surface.

3. The film scanner of claim 2, wherein said LCD unit is rotatably pivotable at an edge of said top surface around an axis parallel to said edge, between an angle such that said photographic film is interposed between said top surface and said LCD unit and an angle disclosing said photographic film.

4. The film scanner of claim 2, wherein said image scanner unit is rotatably pivotable at an edge of said top surface around an axis parallel to said edge, between an angle such that said photographic film is interposed between said top surface and said image scanner unit, and an angle disclosing said photographic film.

5. The film scanner of claim 2, wherein said back-light unit comprises a light source extending in parallel to said image scanner unit; an arcuate reflector partially encompassing said light source that is rotatable around said light source such that light from said light source is radiated one of in parallel to said top surface and perpendicular to said image scanner unit.

6. The film scanner of claim 2, wherein said LCD unit and said image scanner unit are rotatably pivotable at an edge of said top surface around axes substantially coaxial and parallel to said edge, between an angle such that said photographic film is interposed between said top surface and at least one of said LCD unit and said image scanner unit, and an angle disclosing said photographic film.

7. The film scanner of claim 2, wherein said LCD unit is rotatably pivotable at an edge of said top surface around axis parallel to said edge, between an angle such that said photographic film is interposed between said top surface and said LCD unit and an angle disclosing said photographic film, and said image scanner unit extends along and is rotatably pivotable at an opposite edge to said edge of said top surface around an axis parallel to said opposite edge, between an angle such that said photographic film is interposed between said top surface and said image scanner unit, and an angle disclosing said photographic film.

8. The film scanner of claim 2, wherein said top surface is separated to said film supporting surface that guides said photographic film and another surface that is irradiated by said light directed to said LCD unit, said image scanner unit is positioned on and partially covers said film supporting surface, and said LCD unit is securely attached to said other surface.

9. The film scanner of claim 1, wherein said film supporting surface is a bottom surface of said body, and said LCD unit is disposed on a top surface of said body, said image scanner unit is disposed on said bottom surface of said body, and said back-light unit radiates light from said bottom surface.

10. The film scanner of claim 9, wherein said LCD unit is rotatably pivotable at an edge of said top surface around an axis parallel to said edge, said photographic film being interposed between said bottom surface and said line sensor.

11. The film scanner of claim 1, wherein said film supporting surface is a bottom surface of said body, and said back-light unit further comprises a prism that directs said light from a top surface downward along an outer side surface of said body, said LCD unit being disposed on said top surface, and said image scanner unit being disposed at a bottom of said body and irradiated by said directed light.

12. The film scanner of claim 11, wherein said LCD unit is rotatably pivotable at an edge of said top surface around an axis parallel to said edge, said photographic film being interposed between said bottom surface and said line sensor.

13. The film scanner of claim 11, further comprising a diffusion unit placed in front of said image scanner unit that diffuses said light directed by said prism.

14. The film scanner of claim 1, further comprising a diffusion unit that diffuses said light of said back-light unit.

15. The film scanner of claim 1, wherein said image scanner unit further comprises a conveyer unit that conveys said photographic film.

16. A film scanner that electronically scans an image recorded on a photographic film, comprising:

a body including a film supporting surface that slidably guides said photographic film;

a back-light unit disposed in said body that radiates light from said film supporting surface;

an image scanner unit that scans said image on said photographic film illuminated by said light of said back-light unit; and a liquid crystal display (LCD) unit that displays said image scanned by said image scanner unit and is illuminated by said light of said back-light unit, wherein said film supporting surface is a top surface of said body, and said LCD unit and said image scanner unit are disposed on said top surface.

17. A film scanner that electronically scans an image recorded on a photographic film, comprising:

a body including a film supporting surface that slidably guides said photographic film;

a back-light unit disposed in said body that radiates light from said film supporting surface;

an image scanner unit that scans said image on said photographic film illuminated by said light of said back-light unit; and a liquid crystal display (LCD) unit that displays said image scanned by said image scanner unit and is illuminated by said light of said back-light unit, wherein said film supporting surface is a bottom surface of said body, and said back-light unit further comprises a prism that directs said light from a top surface downward along an outer side surface of said body, said LCD unit being disposed on said top surface, and said image scanner unit being disposed at a bottom of said body and irradiated by said directed light.

* * * * *